United States Patent
Imamura

(10) Patent No.: US 7,066,559 B2
(45) Date of Patent: Jun. 27, 2006

(54) BRAKE PRESSURE ESTIMATING APPARATUS AND METHOD

(75) Inventor: Masamichi Imamura, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/651,096

(22) Filed: Aug. 29, 2003

(65) Prior Publication Data

US 2004/0041470 A1    Mar. 4, 2004

(30) Foreign Application Priority Data

Aug. 30, 2002    (JP)    ............... 2002-253141

(51) Int. Cl.
    B60T 8/24    (2006.01)
(52) U.S. Cl. .................... 303/140; 303/146
(58) Field of Classification Search ............ 303/20, 303/3, 15, 140, 139, 146
    See application file for complete search history.

(56) References Cited

U.S. PATENT DOCUMENTS

| | | | |
|---|---|---|---|
| 4,749,239 A | | 6/1988 | Onogi et al. |
| 5,551,770 A | | 9/1996 | Hrovat et al. |
| 5,774,821 A | * | 6/1998 | Eckert .................. 303/140 |
| 5,862,503 A | * | 1/1999 | Eckert et al. ............ 303/140 |
| 6,078,858 A | | 6/2000 | Tozu et al. |
| 6,128,569 A | | 10/2000 | Fukushima |
| 6,234,583 B1 | * | 5/2001 | Eckert ...................... 303/3 |
| 6,508,522 B1 | | 1/2003 | Li et al. |

FOREIGN PATENT DOCUMENTS

| | | |
|---|---|---|
| DE | 195 15 060 A1 | 5/1996 |
| DE | 198 33 242 A1 | 2/1999 |
| JP | 08104219 A   * | 4/1996 |
| JP | 09323634 A   * | 12/1997 |
| JP | 10264803 A   * | 10/1998 |
| WO | WO 00/38966 | 7/2000 |

* cited by examiner

Primary Examiner—Robert A. Siconolfi
(74) Attorney, Agent, or Firm—Foley & Lardner LLP

(57) ABSTRACT

In brake pressure estimating method and apparatus for an automotive vehicle, at a second wheel cylinder brake liquid pressure estimating, a vehicular state is detected and the second wheel cylinder brake liquid pressure for each road wheel is calculated from the detected vehicular motion state, and, at a master cylinder liquid pressure estimating, a master cylinder liquid pressure estimated value is outputted to make a difference between a first wheel cylinder brake liquid pressure estimated value based on a vehicle model and the second wheel cylinder brake liquid pressure estimated value based on a hydraulic unit model small to cause the master cylinder liquid pressure estimated value to be converged into a true value thereof.

26 Claims, 8 Drawing Sheets

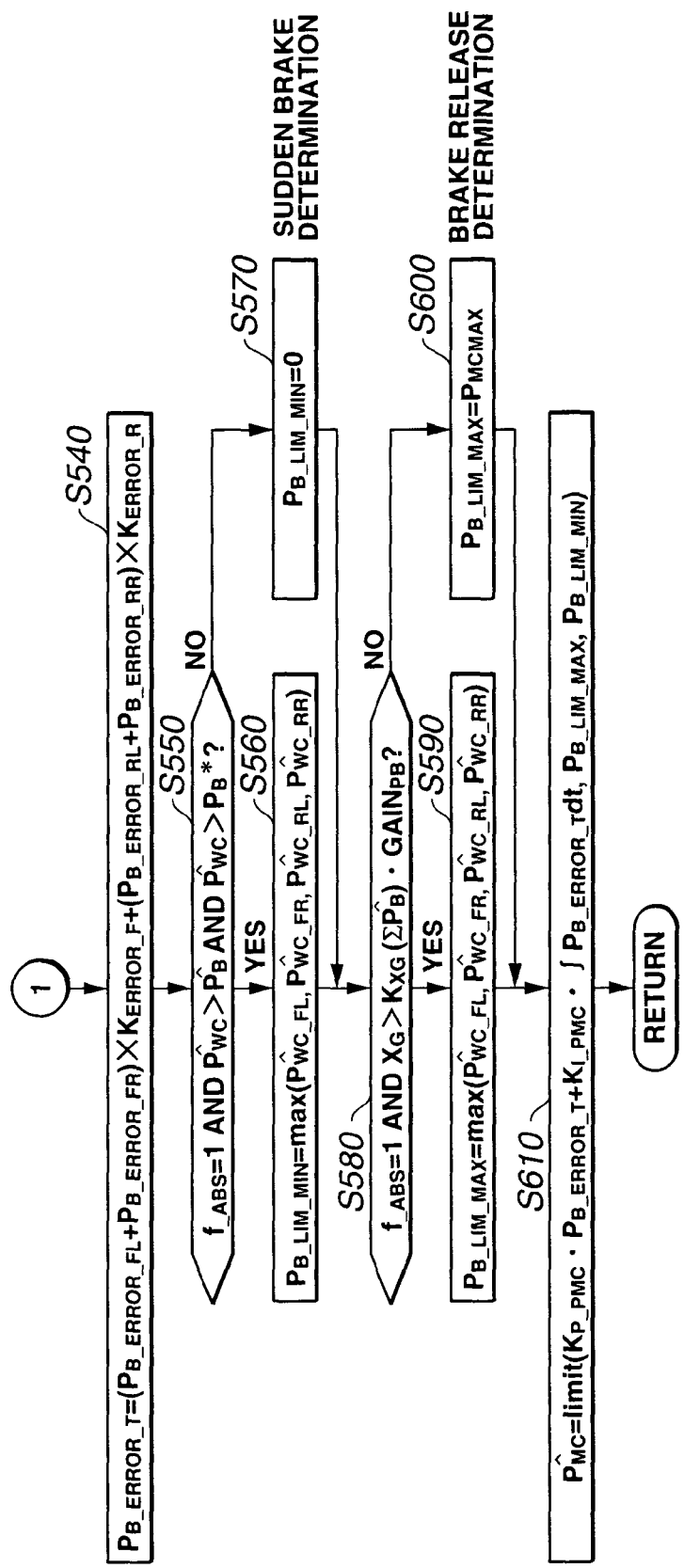

BRAKE PRESSURE ESTIMATING APPARATUS AND METHOD

BACKGROUND OF THE INVENTION

1. Field of the Invention

The present invention relates to brake pressure estimating apparatus and method applicable to an automotive vehicle, especially for estimating a liquid pressure of a master cylinder of a brake system.

2. Description of the Related Art

Recently, a variety of functions are added to a brake system equipped within a vehicle. For example, an anti-skid brake system (or an anti-lock brake system (so called, ABS) to shorten a braking distance while maintaining a vehicular motion stably by preventing, for example, a wheel lock, a traction control system which prevents a wheel spin of driven wheels during such a vehicular acceleration as described above, a brake assistance system which supplies a sufficient brake pressure to wheel cylinders when the brake pressure in accordance with a manipulation of a vehicular driver becomes insufficient, and/or a vehicle dynamic control system (so-called, VDC) to secure a vehicular running stability by providing road wheels with a braking force irrespective of a presence or absence of the driver's brake manipulation so as to eliminate an over-steer or an under-steer of the vehicle is provided within the brake system.

SUMMARY OF THE INVENTION

If, in the vehicle in which the above-described brake system is equipped, the brake pressuures of the wheel cylinders or the brake pressure developed due to a deriver's brake pedal depression can accurately be grasped, it becomes possible to control a drive time duration of control valves to control the brake pressure of each wheel cylinder more precisely. A control accuracy of the brake system becomes more accurate. Because of this, it may be considered that a brake liquid pressure sensor(s) is disposed in the master cylinder and/or the respective wheel cylinders to measure liquid pressures in the master cylinder and/or wheel cylinders, such a method as described above increases merely a manufacturing cost. With the cost in mind, such a method that a measurement of only a master pressure sensors to the measured liquid pressures of the wheel cylinders are eliminated and estimated by calculating what kind of variation in a liquid pressure model of the brake pressure is given. However, with the problem of the cost in mind, a method of estimating the wheel cylinder liquid pressures by calculating in which way a variation is given to a liquid pressure model of the brake system has been proposed. In the above-described method, it is possible to delete the liquid pressure sensors for measuring the liquid pressures in the wheel cylinders to measure the liquid pressures of the wheel cylinders, it still becomes necessary to measure the brake liquid pressure sensor to measure the liquid pressure of the master cylinder. In terms of the cost of the apparatus, it still be disadvantageous.

It is an object of the present invention to provide brake pressure estimating apparatus and method applicable to an automotive vehicle which are capable of increasing the control accuracy of the brake system by estimating the liquid pressures of the master cylinder and respective wheel cylinders with a high accuracy without use of the measurement errors.

According to one aspect of the present invention, there is provided a brake pressure estimating apparatus for an automotive vehicle, comprising: a brake system including a master cylinder which develops a hydraulic in response to at least a brake manipulation as a hydraulic source and a brake pressure controlling section that is enabled to arbitrarily control a brake pressure of each wheel cylinder; a first wheel cylinder brake liquid pressure estimating section that estimates a first brake liquid pressure of the wheel cylinder of each road wheel on the basis of a model of the brake pressure controlling section for each control period; a second wheel cylinder brake liquid pressure estimating section that estimates a second brake liquid pressure of the wheel cylinder for each road wheel on the basis of a vehicular model with a vehicular state as an element of the model for each control period; and a master cylinder liquid pressure estimating section that estimates a liquid pressure of the master cylinder for each control period on the basis of the first and second brake liquid pressure estimated values of the wheel cylinder of each road wheel estimated by the first wheel cylinder liquid pressure estimating section and the second wheel cylinder brake liquid pressure estimating section, the first wheel cylinder liquid pressure estimating section calculating section that calculates the first brake liquid pressure of the wheel cylinder of each road wheel on the basis of the master cylinder liquid pressure estimated value estimated at a previous control period and the first liquid pressure estimated value estimated at the previous control period, the second wheel cylinder brake liquid pressure estimating section including a vehicular motion state detecting section that detects a vehicular state and calculating the second wheel cylinder brake liquid pressure for each road wheel from the detected vehicular motion state, and the master cylinder liquid pressure estimating section outputting the master cylinder liquid pressure estimated value to make a difference between the first wheel cylinder brake liquid pressure estimated value and the second wheel cylinder brake liquid pressure estimated value small to the first wheel cylinder brake liquid pressure estimating section to cause the master cylinder liquid pressure estimated value to be converged into a true value thereof.

According to another aspect of the present invention, there is provided a brake pressure estimating method for an automotive vehicle, the automotive vehicle comprising: a brake system including a master cylinder which develops a hydraulic in response to at least a brake manipulation as a hydraulic source and a brake pressure controlling section that is enabled to arbitrarily control a brake pressure of each wheel cylinder, the brake pressure estimating method comprising: estimating a first brake liquid pressure of the wheel cylinder of each road wheel on the basis of a model of the brake pressure controlling section for each control period; estimating a second brake liquid pressure of the wheel cylinder for each road wheel on the basis of a vehicular model with a vehicular state as an element of the model for each control period; and estimating a liquid pressure of the master cylinder for each control period on the basis of the first and second brake liquid pressure estimated values of the wheel cylinder of each road wheel, at the first wheel cylinder liquid pressure estimating, calculating the first brake liquid pressure of the wheel cylinder of each road wheel on the basis of the master cylinder liquid pressure estimated value estimated at a previous control period and the first liquid pressure estimated value estimated at the previous control period, at the second wheel cylinder brake liquid pressure estimating, detecting a vehicular state and calculating the second wheel cylinder brake liquid pressure for each road wheel from the detected vehicular motion state, and, at the master cylinder liquid pressure estimating, outputting the master cylinder liquid pressure estimated value to make a difference between the first wheel cylinder brake liquid pressure estimated value and the second wheel cylinder brake liquid pressure estimated value small to cause the master cylinder liquid pressure estimated value to be converged into a true value thereof.

This summary of the invention does not necessarily describe all necessary features so that the invention may also be a sub-combination of these described features.

BRIEF DESCRIPTION OF THE DRAWINGS

FIGS. 7 and 8 are integrally a flowchart for explaining the wheel cylinder liquid pressure estimation procedure and the master cylinder liquid pressure procedure executed in the brake liquid pressure estimating apparatus shown in FIG. 1.

DETAILED DESCRIPTION OF THE PREFERRED EMBODIMENT

Reference will hereinafter be made to the drawings in order to facilitate a better understanding of the present invention.

Figure 1:
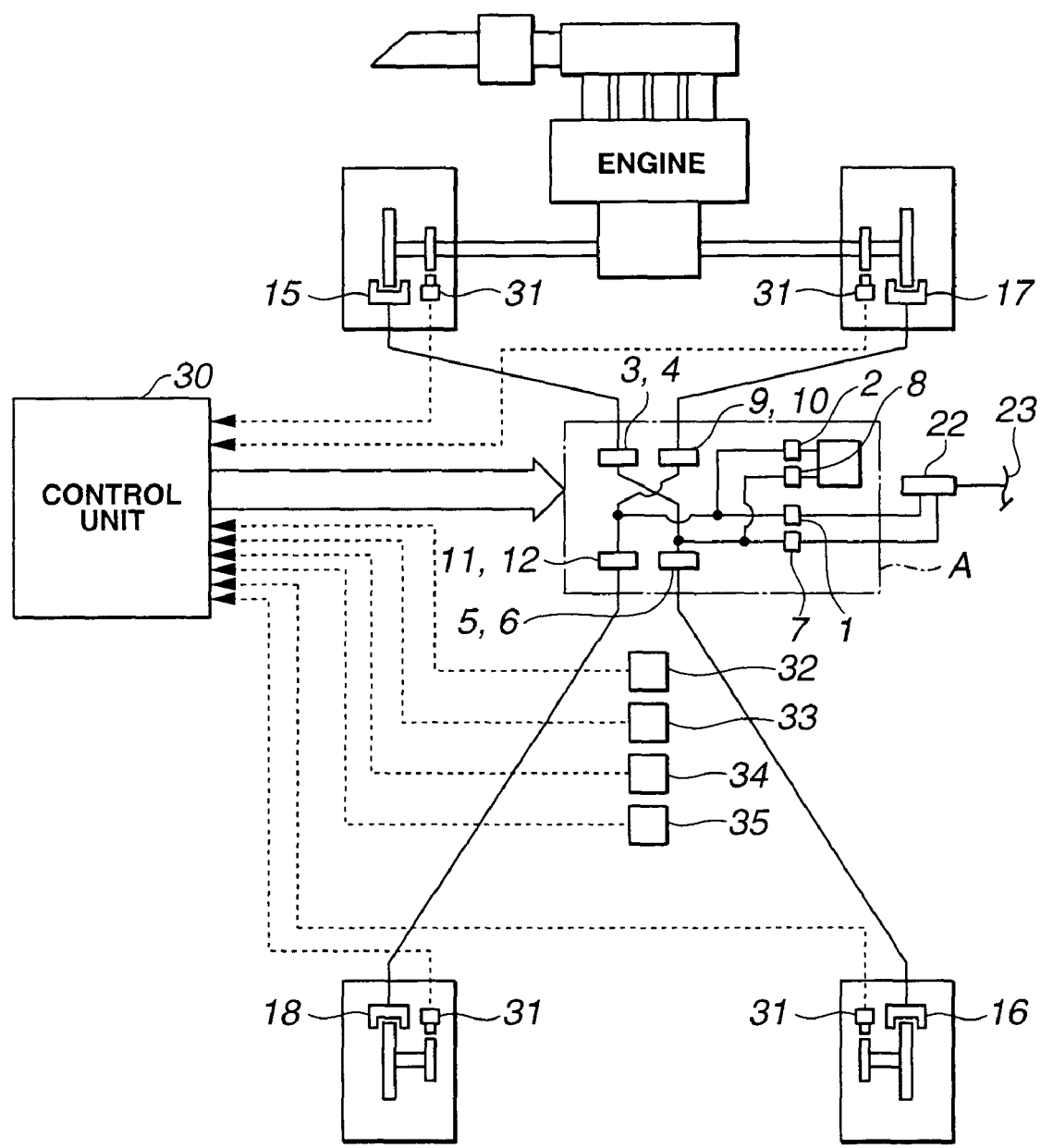
FIG. 1 is a whole configuration view of a brake system of an automotive vehicle to which a preferred embodiment of a brake pressure estimating apparatus according to the present invention is applicable.
Figure 2:
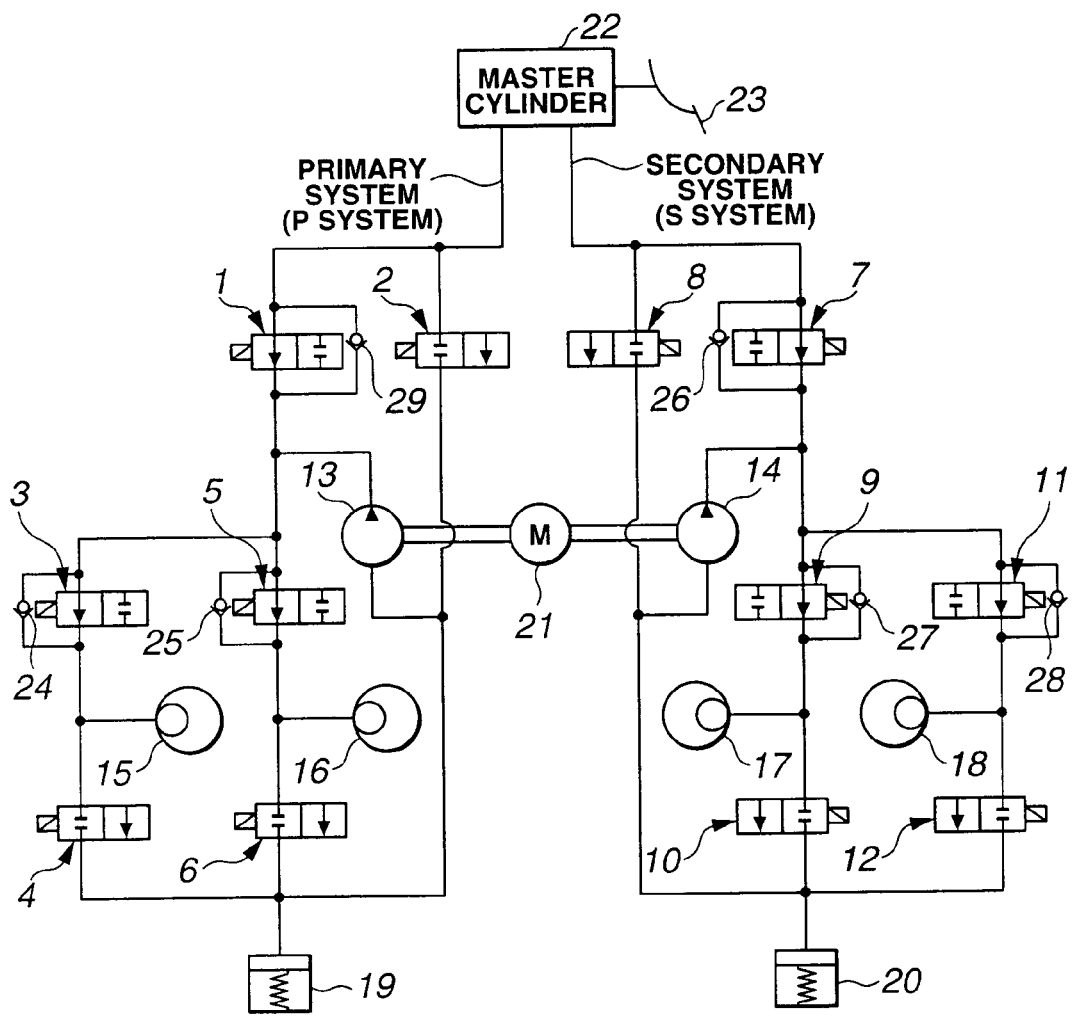
FIG. 2 is a hydraulic circuit block diagram of the brake system, particularly, a brake hydraulic control actuator shown in FIG. 1.

FIG. 1 is a whole view of a brake system of an automotive vehicle to which a brake pressure estimating apparatus in a preferred embodiment according to the present invention is applicable. FIG. 2 shows a hydraulic circuit block diagram of a brake hydraulic pressure control actuator A shown in FIG. 1. Four wheel cylinders 15, 16, 17, and 18 are connected to a master cylinder 22 via two system brake distribution tubes (Primary system (P-system) and Secondary system (S-system)) to master cylinder 22. A brake manipulation control actuator A is disposed in a midway through P system and S system. Brake hydraulic control actuator A includes: liquid pressure control valves (IN values 3, 5, 9, and 11 and OUT valves 4, 6, 10, and 12) which are capable of pressure increasing, pressure holding, and pressure decreasing of liquid pressures of the respective wheel cylinders 15, 16, 17, and 18; control purpose hydraulic source switch valves (P-system cut valve 1, a P-system suction valve 2, S-system cut valve 7, and S-system suction valve 8) which are separately installed from master cylinder 22 and which switch the connections of hydraulic sources that are driven with a motor 21 (P system pump 13 and S system pump 14) and reservoirs 19 and 20. When a hydraulic pressure is developed in master cylinder 22 in response to a manipulation on a brake pedal 23, a normal brake state wherein the liquid pressure of mater cylinder 22 is supplied to wheel cylinders 15, 16, 17, and 18 and a control brake state wherein the liquid pressures of control purpose hydraulic sources 13 and 14 are supplied to wheel cylinders 15, 16, 17, and 18 and respective liquid pressure control valves optimally control the respective wheel cylinders 15 through 18 when the vehicle driver does not manipulate the brake or when a liquid pressure more than the brake manipulation is needed are switchable threbetween.

Herein, a case where the pressure in one of wheel cylinders 15 for the P-system is to be controlled will be described below.

During the pressure increase state by means of P-system pump 13, P-system suction valve 2 is opened and the brake liquid is supplied to P system pump 13. Then, P system cut valve 1 and other wheel IN valve 5 are closed to suppress a wraparound to the other system of the brake liquid. During the pressure-decrease under this state, P system suction valve 2 is closed and P system cut valve 1 is opened so that the wheel cylinder liquid is caused to flow out into master cylinder 22. During the pressure increase by means of master cylinder 22, P-system cut valve 1 is opened and P-system suction valve 2 is interrupted and IN valves 3 and 5 are opened. Thus, the master cylinder liquid quantity is caused to flow into the wheel cylinder side. During the pressure decrease, IN valves 3 and 5 are interrupted and OUT valves 4 and 6 are opened. The wheel cylinder liquid is caused to flow out to reservoir 19.

Figure 3:
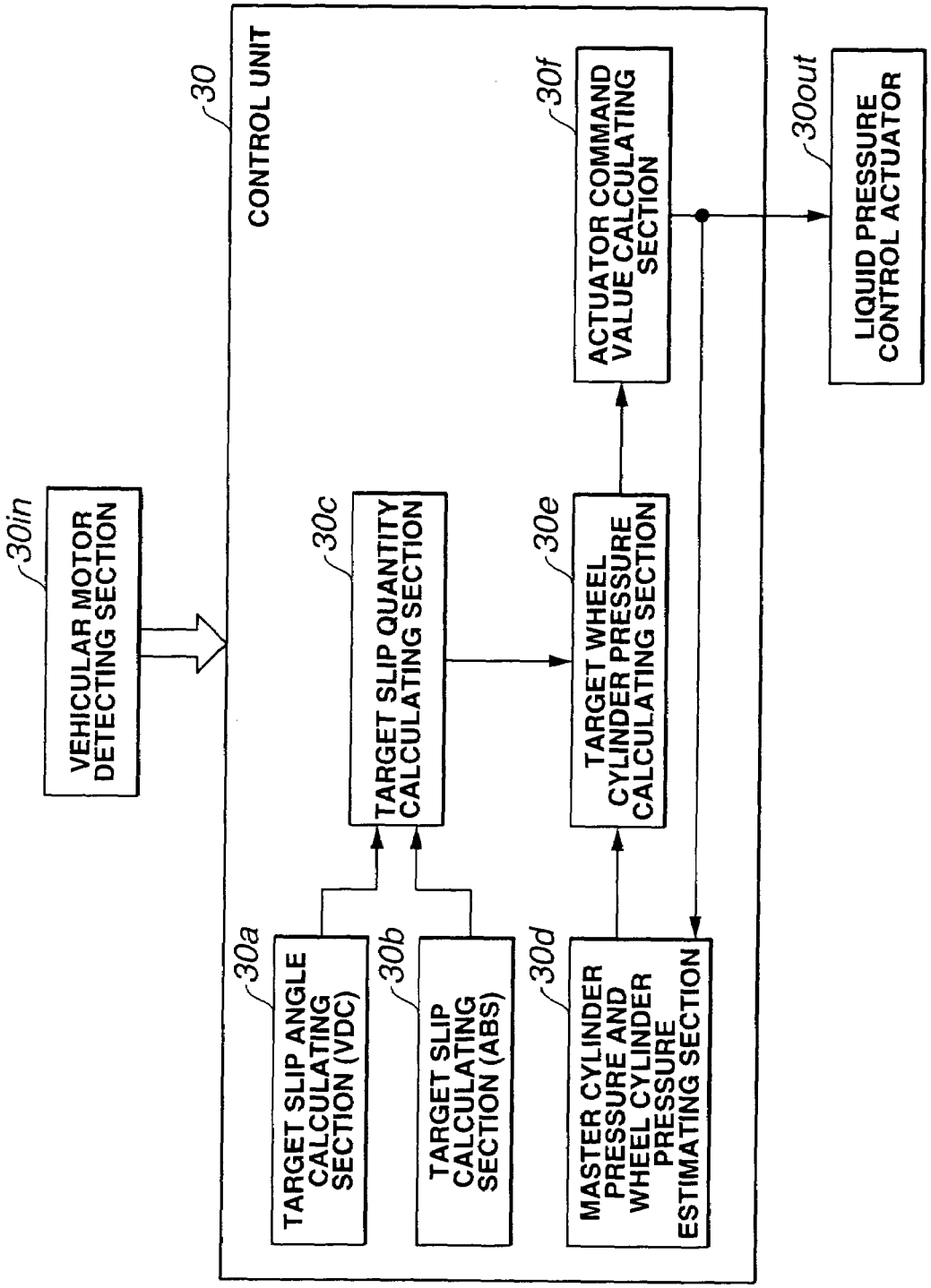
FIG. 3 is a functional block diagram representing a structure of a control unit shown in FIG. 1.

FIG. 3 shows a block diagram representing a structure of a control unit 30. Control unit 30 is connected to a vehicular motion detecting section 30in. Vehicular motion detecting section 30in includes: road wheel velocity sensors 31; a steering wheel angular sensor 32; and a lateral acceleration sensor (hereinafter, also called a lateral G sensor) 33; a yaw rate sensor 34; and a longitudinal G sensor 35. Each road wheel velocity sensor 31 detects a frequency signal in accordance with a revolution speed of a corresponding road wheel using. for example, a pick-up coil or so on. Steering angle sensor 32 is a sensor to detect a steered angle of a steering wheel. Steering angle sensor 32 is a steering angle sensor which outputs a frequency signal in accordance with a steering angular velocity using such as a transistor circuit and performs an integration process to detect a steering angular displacement. Lateral G sensor 33 is a sensor to detect a lateral acceleration and performs a detection in a lateral acceleration, for example, by receiving a lateral force by means of, e.g., a cantilever strain gage. Yaw rate sensor 34 detects a Corioli's force with, e.g., a strain gage to detect a yaw rate (yaw velocity). Longitudinal G sensor 35 is well known.

Control unit 30 functionally includes a target slip angle calculating section 30a which calculates a target slip angle on the basis of a vehicular dynamic controller (VDC) to achieve a stabilization of a vehicular motion; a target slip quantity based on an anti-clock brake control (ABS) which prevents a vehicular road wheel lock during a braking; a (final) slip quantity calculating section 30c for calculating a (final) slip quantity from the two target slip angle and target slip quantity; and an estimating section 30d which estimates a master cylinder and wheel cylinder pressure from the above-described two target slip quantity; a target wheel cylinder calculating section which calculates a target wheel cylinder pressure calculating section from the target slip quantity, estimated master cylinder pressure and wheel cylinder pressure; and an actuator command value calculating section that calculates the command to the liquid pressure control actuator so as to provide a wheel cylinder pressure with the calculated target wheel cylinder pressure. Control unit 30 is connected to a liquid pressure control actuator 30 out (A shown in FIG. 1). Control unit 30 usually includes a microcomputer having a CPU (Central Processing Unit), RAM (Random Access Memory), ROM (Read Only Memory), an Input Port, an Output Port, and a common bus.

A basic control contents of control unit 30 will be described below.

[A vehicle dynamics control (VDC) and an anti-lock brake system (ABS) control]

Figure 4:
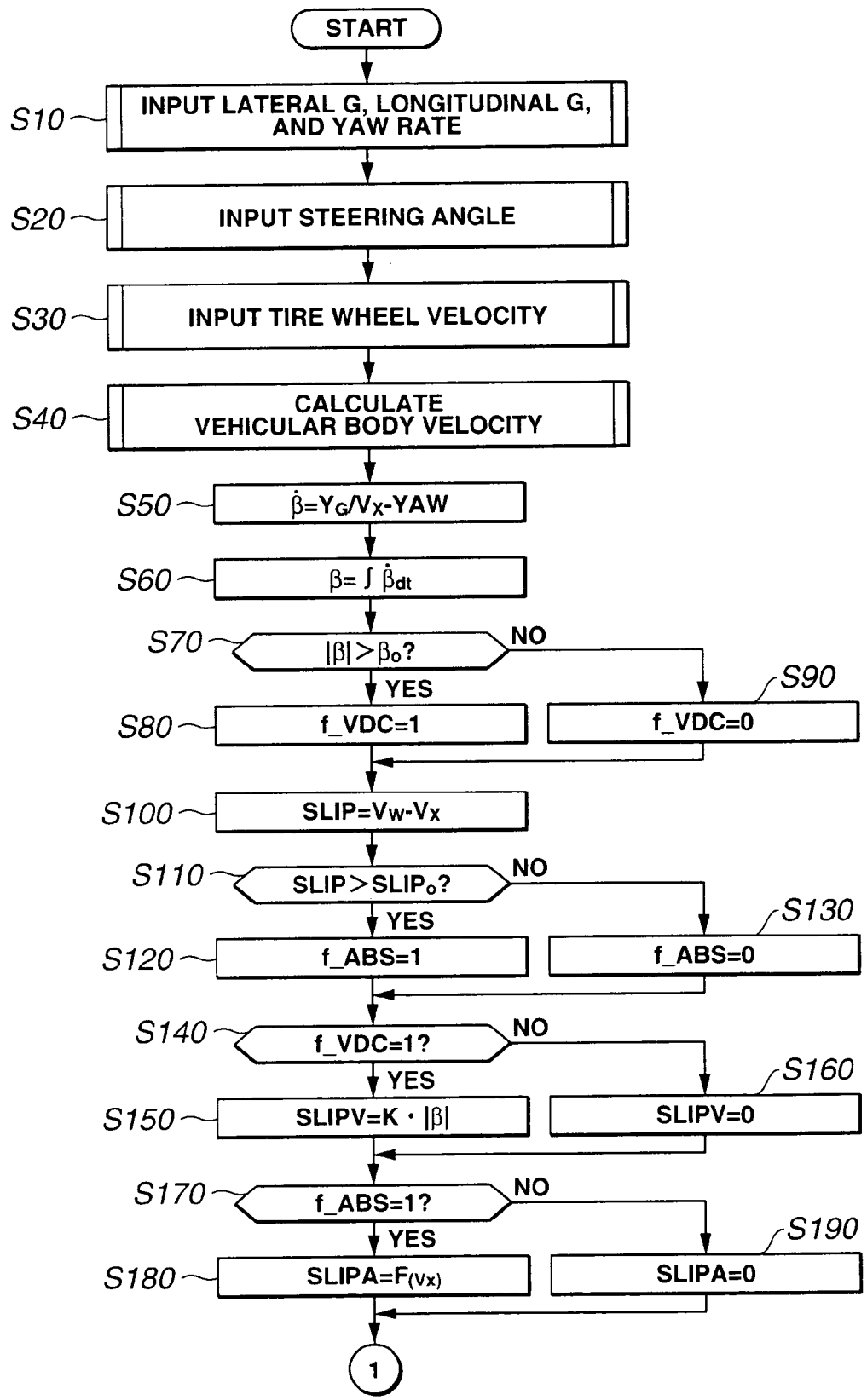
FIGS. 4 and 5 are integrally an operational flowchart representing the contents of control executed by the control unit shown in FIG. 1.
Figure 5:
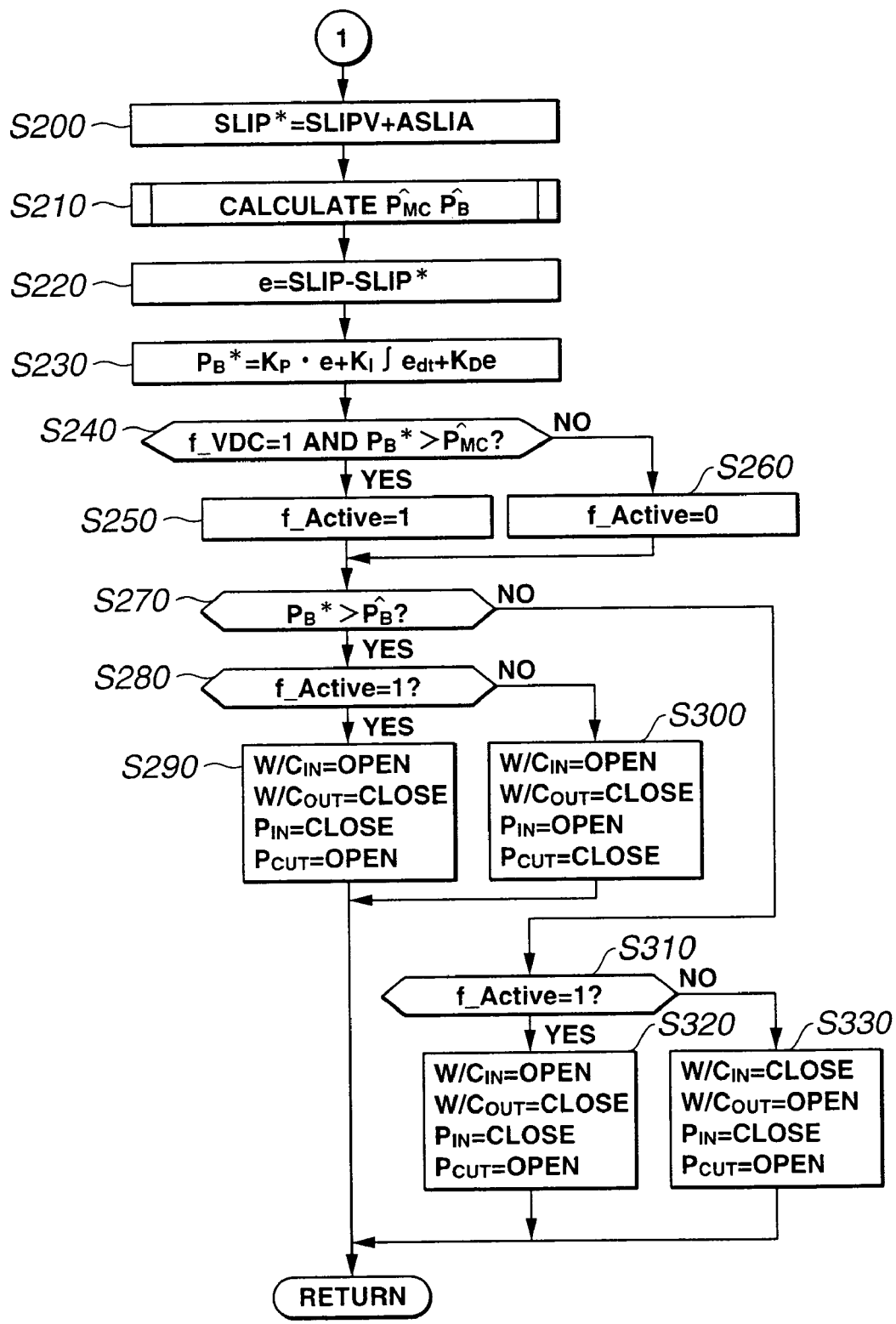

FIGS. 4 and 5 show a flowchart representing the control contents executed in control unit 30. That is to say, at a step S10, control unit 30 reads out longitudinal acceleration $X_G$ from longitudinal G sensor 35, a lateral acceleration $Y_G$ from lateral G sensor 33, and a yaw rate YAW from yaw rate sensor 34, each sensor constituting the vehicular motion detecting section 30in of FIG. 3. At the next step S20, control unit 30 reads a steering angular displacement δ. At a step S30, control unit 30 reads road wheel velocities $V_W$. At a step S40, control unit 30 calculates a vehicular body velocity $V_x$ from road wheel velocities $V_W$. At a step S50, a differential value of a slip angle β is calculated from the following equation. It is noted that the slip angle β is a side slip angle of road wheels with respect to a vehicular forward direction. It is noted that the side slip angle is defined in a U.S. Pat. No. 6,128,569 issued on Oct. 3, 2000, (the disclosure of which is herein incorporated by reference).

$$\dot{\beta} = Y_G/V_x - YAW.$$

At a step S60, control unit 30 calculates slip angle β by integrating the differential value calculated at step S50. At a step S70, control unit 30 determines whether an absolute value of slip angle β is larger than a predetermined value $β_0$. If the absolute value of slip angle β is larger than a predetermined value $β_0$, and control unit 30 determines that a side slip is large so that it is necessary to achieve the stabilization of the vehicular motion. Then, the routine goes to a step S80. However, if the absolute value of slip angle β is not larger than predetermined value $β_0$, control unit 30 determines that the vehicle is running stably and the routine goes to a step S90. At step S90, f_VDC flag is set to "1".

At step S80, "1" is set to a VDC flag f_VDC since control unit 30 determines that VDC control is needed. If SLIP>$SLIP_0$ ($SLIP_0$ denotes a predetermined value by which one tire wheel can obtain a maximum frictional force on a road surface) at step S110 (Yes), control unit 30 determines that the tire wheels tend to be locked and the routine goes to a step S120. If SLIP>$SLIP_0$ at step S110 (Yes), control unit 30 determines that the tires tend to be locked and the routine goes to a step S120. At step S120, control unit 30 determines that the slip quantity is large, the road wheels are tended to be locked, and the ABS operation is needed and sets ABS flag ABS_flag to "1". If SLIP≦$SLIP_0$ at step S110 (No), the routine goes to a step S130. At step S130, control unit 30 determines that slip quantity SLIP is small and the ABS operation is not needed, and ABS flag f_ABS is set to zero. At a step S140, control unit 30 determines whether VDC flag f_VDC is at a "1". If set to "1", the routine goes to step S150 (SLIPV=k·|β|, wherein k denotes a gain. At step S160, "0" is set to target slip quantity SLIPV since VDC is not operated. At step S170, control unit 30 determines whether ABS flag f_ABS indicates "1". Otherwise, the routine goes to a step S190 (at step S190, SLIPA=0). At step S180, target slip quantity SLIPA during the ABS operation is calculated on the basis of vehicular body velocity $V_x$ SLIPA=f($V_x$) - - - (1). At a step S200 in FIG. 5, target slip quantity SLIP* is calculated from target slip angle SLIPV (VDC side) and target slip quantity SLIPA (ABS side). That is to say, SLIP*=SLIPV+SLIPA. At step S210, control unit 30 calculates master and wheel cylinder estimated values $P\hat{}_{MC}$ and $P\hat{}_B$ of master cylinder pressure and wheel cylinder pressure.

It is noted that the calculation of the estimated value will be described later. At a step S220, a deviation e between slip quantity SLIP and target slip quantity SLIP* is calculated as follows: e=SLIP−SLIP*. At step S230, control unit 30 calculates target wheel cylinder pressure $P^*_B$ according to a transfer function described below by means of a PID (Proportional-Integration-Differentiation) control.

That is to say, $P_B^* = K_p e + K_1 \int e \, dt + KD\dot{e}$. At a step S240, control unit 30 determines if VDC flag f_VDC="1" and wheel cylinder pressure target value $P^*_B$ is larger than master cylinder pressure estimated value $P\hat{}_{MC}$. If f_VDC=1 and $P^*_B > P\hat{}_{MC}$, the routine goes to a step S250 and otherwise (neither f_VDC=1 nor $P^*_B > P\hat{}_{MC}$) the routine goes to a step S260.

At step S250, since VDC control is being executed and wheel cylinder pressure target value $P^*_B$ is larger than master cylinder pressure target value $P\hat{}_{MC}$. If f_VDC=1 and $P^*_B > P\hat{}_{MC}$, the routine goes to a step S250. If (No) at step S240, the routine goes to a step S260. At a step S250, control unit 30 determines that VDC control is being executed and $P^*_B > P\hat{}_{MC}$. Then, either hydraulic pumps 13 or 14, one of which is the hydraulic source of the other system, is operated. Then, control unit 30 determines that the brake assistance is needed to be executed and "1" is set to assistance pump flag f_Active. At step S260, in a case where VDC is being executed, since master cylinder pressure estimated value $P\hat{}_{MC}$ is larger than wheel cylinder pressure target value $P^*_B$, it is not necessary to make a brake assistance by means of a pump if VDC is not executed, "0" is set to f_Active. At step S280, control unit 30 determines whether "1" is set to assistance pump flag f_Active. If "1" is set to assistance pump flag f_Active, the routine goes to a step S290. If f_Active="0" at step S280, the routine goes to a step S300.

At a step S290, control unit 30 determines that target wheel cylinder pressure $P^*_B$ is equal to or smaller than master cylinder pressure estimated value $P\hat{}_{MC}$, it is not necessary to drive the assistance pump. However, when determining that a pressure increase from master cylinder 22 is needed, the IN valve is opened, the OUT valve is closed, the cut valve is opened, and a suction valve is closed (refer to FIG. 5). At a step S300, control unit 30 determines that target wheel cylinder pressure $P^*_B$ is larger than master cylinder estimated value $P\hat{}_{MC}$ and the pressure increase by means of the hydraulic pump is needed, IN valve is opened, OUT valve is closed, a cut valve is opened, and suction valve is closed (refer to FIG. 5).

At a step S310, control unit 30 determines whether flag f_Active is set to "1". If Yes (f_Active=1) at step S320, the routine goes to a step S320. If No (f_Active=0) at step S310, the routine goes to a step S330.

At step S320, control unit 30 determines that target wheel cylinder liquid pressure $P^*_B$ is smaller than master cylinder estimated value $P\hat{}_{MC}$ and the pressure increase by means of the assistance pump is needed. However, control unit 30 determines that target wheel cylinder pressure $P^*_B$ is smaller than wheel cylinder pressure estimated value $P\hat{}_B$ and the pressure decrease is needed. Hence, IN valve is opened, OUT valve is closed, cut valve is closed, and suction valve is opened (refer to FIG. 5). On the other hand, at step S330, since target wheel cylinder liquid pressure $P^*_B$ is larger than master cylinder pressure estimated value $T\hat{}_{MC}$, control unit 30 determines that the drive of the assistance pump is not needed. In addition, since the target wheel cylinder liquid pressure $P^*_B$ is larger than the wheel cylinder brake liquid pressure estimated value $P\hat{}_B$, control unit 30 determines that the pressure decrease is needed, IN valve is closed, OUT valve is opened, cut valve is closed, and the suction valve is opened (refer to FIG. 5).

(Liquid Pressure Estimation in Estimating Section)

Figure 6:
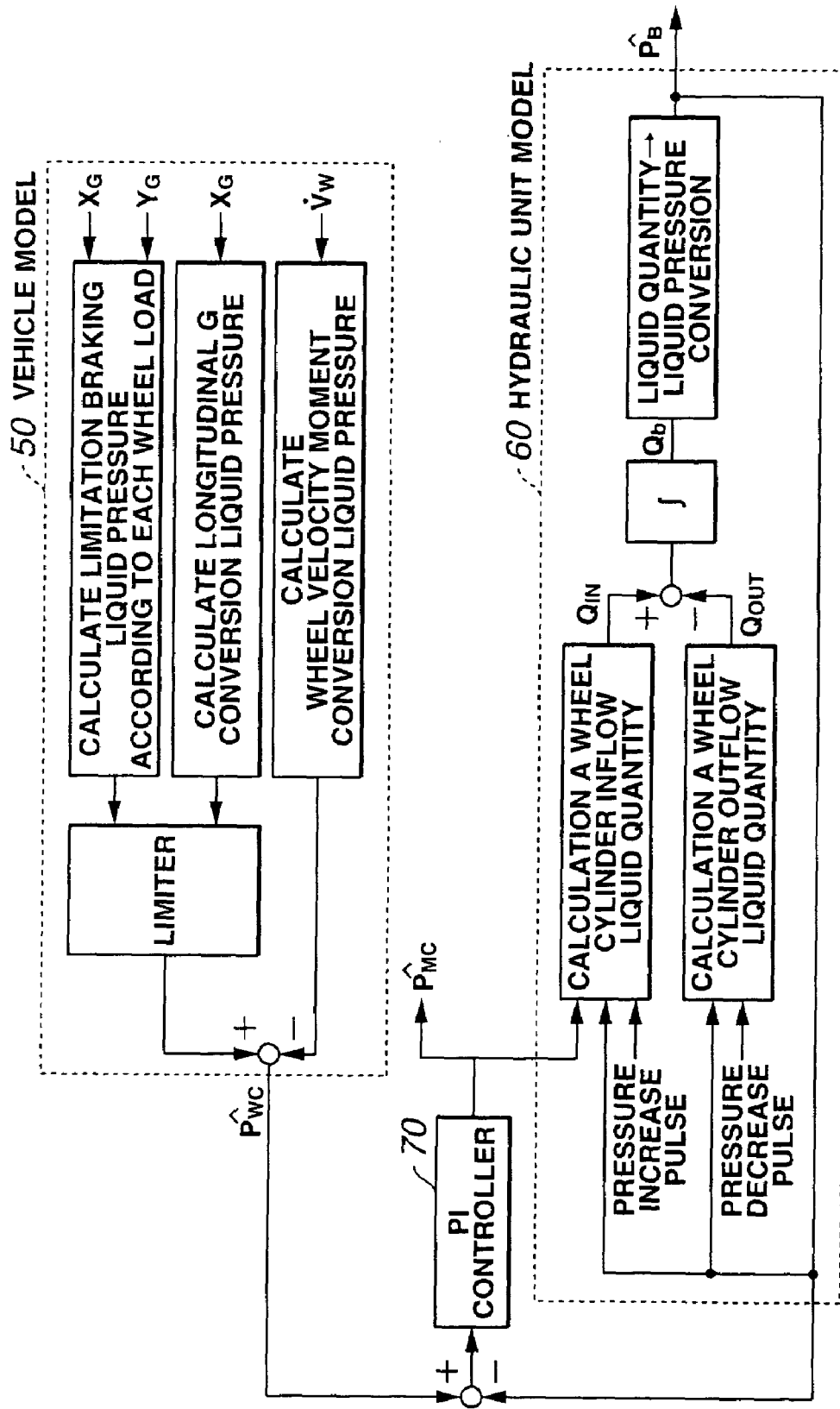
FIG. 6 is a functional block diagram of the control unit representing wheel cylinder liquid pressure estimation procedure and master cylinder liquid pressure estimation procedure.

FIG. 6 shows a block diagram representing a calculation process (corresponds to step S210 shown in to calculate master cylinder liquid pressure and wheel cylinder estimated values of $P\hat{}_{MC}$ and $P\hat{}_B$ (or $P\hat{}_{WC}$) by means of estimating section 30*d* shown in FIG. 3. Estimating section 30*d* includes: a vehicle model 50, a hydraulic pressure (corresponding to the pressure controlling section) model 60, and PI controller 70, as shown in FIG. 6. Vehicle model 50 receives the longitudinal acceleration (G) $X_G$, the lateral acceleration $Y_G$, and wheel velocities Vw and outputs wheel cylinder liquid pressure estimated value $P_{WC}$. Hydraulic unit model 60 receives an open time duration of IN valve and OUT valve (namely, pressure increase pulse duration and pressure decrease pulse duration), a master cylinder pressure estimated value $P\hat{}_{MC}$ estimated by PI controller 70 and wheel cylinder pressure estimated value $P\hat{}_B$ estimated by the hydraulic unit model 60 and outputs wheel cylinder liquid pressure estimated value $P\hat{}_B$. In addition, PI controller 70 receives wheel cylinder brake liquid pressure estimated value P^WC estimated by vehicle model 50 and the same P^B estimated by hydraulic unit model 60 and outputs master cylinder pressure estimated value P^MC by means of a PI (Proportional-Integration) control as will be described later.

Figure 7:
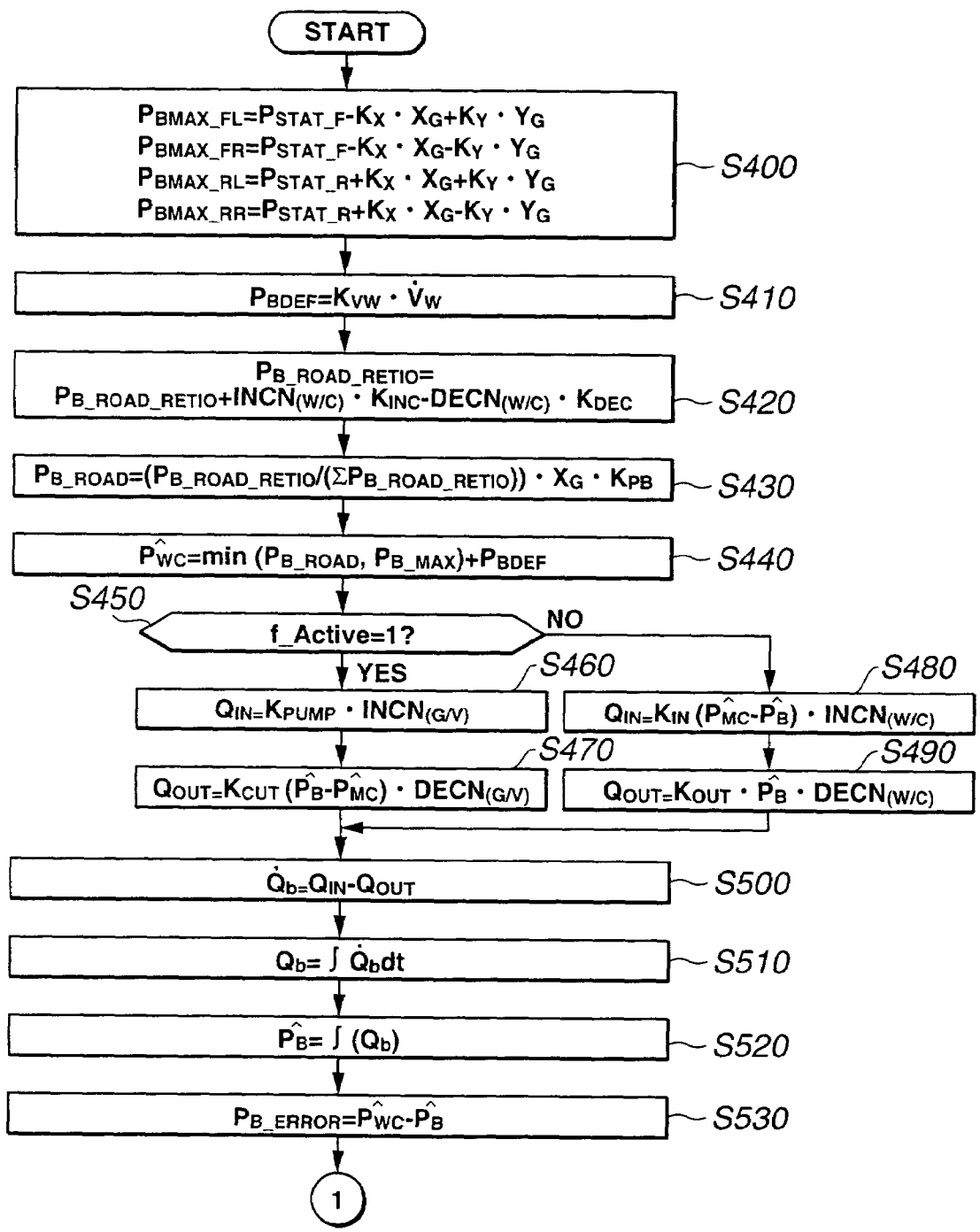

FIGS. 7 and 8 integrally show an operational flowchart representing the control contents of estimating section 30*d* of control unit 30. (Wheel cylinder pressure estimation from vehicular model) At a step S400, control unit 30 calculates a maximum liquid pressure $P_{B\_MAX}$ up to which each road wheel is enabled to be braked. Maximum liquid pressure $P_{B\_MAX}$ is calculated to add a wheel load movement due to a braking or turning to a brake liquid pressure $P_{STAT}$ under a static wheel load. That is to say, $P_{BMAX\_FL} = P_{STAT\_F} - K_X \cdot X_G + K_Y \cdot Y_G$; $P_{BMAX\_FR} = P_{STAT\_F} - K_X \cdot X_G - K_Y \cdot Y_G$; $P_{BMAX\_RL} = P_{STAT\_R} + K_X \cdot X_G + K_Y \cdot Y_G$; and $P_{BMAX\_RR} = P_{STAT\_R} + K_X \cdot X_G - K_Y \cdot Y_G$, wherein $X_G$ denotes a detected value of the longitudinal acceleration of the vehicle, FL denotes a front left road wheel, FR denotes a front right road wheel, RL denotes a rear left road wheel, and RR denotes a rear right road wheel, F denotes a front road wheel side and R denotes a rear road wheel side, $K_X$ denotes a hydraulic pressure conversion coefficient for the longitudinal acceleration, $Y_G$ denotes a detected value of the lateral acceleration, and $K_Y$ denotes a hydraulic pressure conversion coefficient for the lateral acceleration. At a step S410, control unit 30 calculates a liquid pressure variation rate $P_{BDEF}$ due to a vehicular wheel moment.

That is to say, $P_{BDEF} = K_{VW} \cdot \dot{V}w$, wherein $\dot{V}w$ denotes a variation rate of the corresponding wheel velocity detected by each wheel velocity sensor 31 per unit time of the wheel velocities detected by the wheel velocity sensor 31 and $K_{VW}$ denotes a coefficient representing a vehicular wheel inertia moment. Then, at the next step S420, control unit 30 calculates a determination coefficient $P_{B\_ROAD\_RETIO}$ to determine whether a braked road wheel is either under a pressure increase state or a pressure decrease state. It is noted that, at step S420 shown in FIG. 7, INCN denotes a pressure increase pulse, DECN denotes a pressure decrease pulse, $K_{INC}$ denotes a coefficient to convert a pressure increase pulse to a corresponding hydraulic value and $K_{DEC}$ denotes a coefficient to convert the pressure decreasing pulse into a corresponding hydraulic pressure value. As pressure increase pulse INCN becomes larger (wider), the controlled wheel contributes to the decrease in speed. Since wheel cylinder liquid pressure is high, $P_{B\_ROAD\_RETIO}$ is made larger so that the estimated wheel cylinder pressure becomes larger than the other wheels. If pressure decrease pulse DECN becomes larger, the reverse action would follow. That is to say, $P_{B\_ROAD\_RETIO} = P_{B\_ROAD\_RETIO} + INCN(w/c) \cdot K_{INC} - DECN(w/c) \cdot K_{DEC}$. At a step S430, the brake liquid pressure conversion is carried out for longitudinal G with a coefficient $K_{PB}$ determined according to the vehicular weight and brake pad frictional coefficient μ, the braking liquid pressure distribution for each wheel is carried out with a previously derived $P_{B\_ROAD\_RETIO}$ to derive $P_{B\_ROAD}$ of each wheel braking liquid pressure. That is to say, $P_{B\_ROAD} = (P_{B\_ROAD<<\_RETIO}/(\Sigma P_{B\_ROAD\_RETIO})) \cdot X_G \cdot K_{PB}$.

At a step S440, control unit 30 detects $PB_{\_ROAD}$ only from the braking force component. Since the liquid pressure $P_{BDEF}$ corresponding to the deceleration of the road wheel velocity due to the excessive application on the brake not appearing on the longitudinal G, wheel cylinder liquid pressure estimated value $P\hat{}_{WC}$ is calculated by adding liquid pressure $P_{BDEF}$ corresponding to the deceleration of the road wheel velocity. However, since $P_{B\_ROAD}$ is not in excess of maximum braking liquid pressure $P_{B\_MAX}$, a select low processing between $P_{B\_ROAD}$ and $P_{B\_MAX}$ is carried out as the limiter processing and $P_{BDEF}$ is added to the selected value. That is to say, $P\hat{}_{WC} = \min(P_{B\_ROAD}, P_{B\_MAX}) + P_{BDEF}$.

(Hydraulic Unit Model Wheel Cylinder Pressure Estimation)

A liquid quantity passing through suction valve (for example, P-system suction valve 2 and S-system suction valve 8 in FIG. 2) is determined according to capabilities (or capacity) of the hydraulic pumps 13 and 14. Another valve passing quantity is determined by a forward-and-rearward pressure difference of each valve and a valve open time duration. During the pump pressure increase, the pressure increase is carried out with P-system or S-system suction valve 2 or 8. During a pump pressure decrease, the pressure decrease is carried out through P-system or S-system cut valve 1 or 7. The forward-and-rearward pressure difference of each cut valve indicates the wheel cylinder liquid pressure and master cylinder liquid pressure. In addition, the pressure increase by means of the master cylinder is carried out with IN valves 3, 5, 9, and 11. The forward-and-rearward pressure difference of master cylinder liquid pressure plus wheel cylinder liquid pressure. The pressure decrease by means of the master cylinder pressure is carried out with OUT valves 4, 6, 10, and 12 (refer to FIG. 2). Thus, the forward-and-rearward pressure difference is the wheel cylinder liquid pressure and reservoir pressure of reservoir 19. However, since reservoir pressure is basically zero, it depends upon only wheel cylinder pressure.

At a step S450, control unit 30 determines whether the pump pressure increase is present, namely, whether assistance pump flag f_Active is set to "1". If the pump pressure increase is present at step S450, control unit 30 determines that the pump pressure increase is present. Then, the routine goes to a step S460. At step S460, inflow quantity for the corresponding one of the wheel cylinders $Q_{IN}$ is calculated: that is to say, $Q_{IN} = K_{PUMP} \cdot INCN_{(G/V)}$. If f_Active=0 at step S450, the routine goes to a step S480. At the next step S470, control unit 30 calculates a wheel cylinder outflow liquid quantity $Q_{OUT}$ from the wheel cylinder by multiplying a pressure difference between pressure decrease pulse DECN and wheel cylinder pressure estimated value $P\hat{}_B$ with a master cylinder pressure estimated value $P\hat{}_{MC}$ with a cut valve capacity coefficient $K_{CUT}$ to calculate wheel cylinder liquid outflow quantity. That is to say, $Q_{OUT}=K_{CUT}(P\hat{}_B-P\hat{}_{MC})\cdot DECN_{(G/V)}$. At step S480, $Q_{IN}=K_{IN}(P\hat{}_{MC}-P\hat{}_B)\cdot INCN(w/c)$. At the next step S490, control unit 30 calculates flow-out liquid quantity QOUT from wheel cylinders by multiplying a pulse time duration DECN of a wheel cylinder OUT valve with coefficient $K_{OUT}=K_{OUT}\cdot P\hat{}_B\cdot DECN$ (w/c). Then, at a step S500, control unit 30 calculates dQb/dt per unit time of wheel cylinder to calculate $\int \dot{Q}_b dt$. At the next step S520, control unit 30 converts the wheel cylinder liquid quantity into $\int(Qb)$.

In the above steps shown in FIG. 7, control unit 30 converts wheel cylinder liquid quantity Qb into wheel cylinder liquid pressure estimated value $P\hat{}_B$ using a correlation between the wheel cylinder liquid quantity and the liquid pressure. The above steps calculate different two wheel cylinder liquid pressure estimated values $P\hat{}_{WC}$ and $P\hat{}_B$. If $P\hat{}_{WC}=P\hat{}_B$, control unit 30 serves to provide a real master cylinder pressure estimated value.

At a step S530, control unit 30 calculates wheel cylinder pressure error $P_{B\_ERROR}$ ($=P\hat{}_{WC}-P\hat{}_B$). At a step S540 in FIG. 8, control unit 30 calculates a total of wheel cylinder pressure errors $P_{B\_ERROR\_T}$ of wheel cylinder pressure errors for four wheels. At this time, since the braking force tends to be large at front road wheels and to be small at rearward road wheels, front road wheel side gain $K_{ERROR\_F}$ and rear road wheel side gain $K_{ERROR\_R}$ are multiplied with front road wheel cylinder pressure errors and rear road wheel cylinder pressure errors $\{(P_{B\_ERROR\_FL}+P_{B\_ERROR\_FR})\times K_{ERROR\_F}+(P_{B\_ERROR\_RL}+P_{B\_ERROR\_RR})\times K_{ERROR\_R}\}$, respectively.

(Sudden Brake Estimation Delay Correction Control)

At a step S550, control unit 30 determines whether during the anti-lock brake system operation (f_ABS=1) and when wheel cylinder pressure estimated value $P_{WC}$ by means of the vehicle model is larger than wheel cylinder pressure estimated value $P\hat{}_B$ by means of the hydraulic unit model described above and brake control target value $P*_B$, the routine goes to a step S560. Otherwise (No) at step S550, the routine goes to a step S570. At step S560, the deceleration is large and target value is small, in other words, as the wheel lock tendency occurs due to the sudden brake during the ABS operation, a lower limit value of the master cylinder pressure estimated value is set as a maximum value of $P\hat{}_{WC}$. That is to say, control unit 30 determines if f_ABS=1 and $P\hat{}_{WC}>P\hat{}_B$ and $>P*_B$. As an alternative, the lower limit value of the master cylinder pressure estimated value may be set as a front road wheel cylinder pressure estimated value $P\hat{}_{WC}$. That is to say, since the rear road wheels have small braking forces and estimation errors of wheel cylinder estimated value $P\hat{}_{WC}$ can be enlarged. If Yes at step S550, namely, the SBS is being executed and $P\hat{}_{WC}>P\hat{}_B$ and $>P*_B$, the routine goes to a step S560. At step S560, $P_{B\_LIM\_MIN}=\max (P\hat{}_{WC\_FL}, P\hat{}WC_{FR}, P\hat{}_{WC\_RL}, P\hat{}_{WC\_RR})$. At a step S570, a lower limit value of the master cylinder pressure estimated value is set to zero. That is to say, $P_{B\_LIM\_MIN}=0$.

(Sudden Brake Release Estimation Delay Correction Control)

At step S580, a total of estimated values $P\hat{}_B$ of the wheel cylinder pressures by means of the hydraulic unit model is multiplied with coefficient $K_{XG}$ dependent upon the vehicle weight and brake pad frictional coefficient μ to convert this estimated value $P\hat{}_B$ into the longitudinal G. This converted value multiplied with a gain $GAIN_{PB}$ ($0<GAIN_{PB}<1$, for example, about 0.5) is compared with $X_G$ detected by longitudinal G sensor 35 to determine a brake release. That is to say, in a case where the brake is released during the ABS operation, check valves 24 through 29 cause the brake liquid from the wheel cylinder to flow out to the master cylinder passing through cut valves 1 and 7 (refer to FIG. 2). Hence, each wheel cylinder pressure is not made equal to or higher than the master cylinder pressure $P\hat{}_{MC}$. In addition, in a case where the estimated pressure is large with respect to the longitudinal G, there is a high possibility that master cylinder pressure estimated value $P\hat{}_{MC}$ is erroneously set to be higher. In this case, wheel cylinder pressure estimated value $P\hat{}_{WC}$ estimated by the longitudinal G=master cylinder pressure.

If f_ABS=1 and $X_G>K_{XG}\cdot(\Sigma P\hat{}_B)\cdot GAIN_{PB}$, the routine goes to a step S590. If No at step S580, the routine goes to a step S600. At step S590, control unit 30 sets the upper limit value of the master cylinder pressure estimated value to the maximum value of each wheel cylinder pressure estimated value estimated from the vehicle model. That is to say, $P_{B\_LIM\_MAX}=\max (P\hat{}_{WC\_FL}, P\hat{}_{WC\_FR}, P\hat{}_{WC\_RR})$. At a step S600, control unit 30 sets the upper limit value of the master cylinder pressure estimated value to a maximum pressure $P_{MCMAX}$ that the master cylinder 22 can develop. That is to say, $P_{B\_LIM\_MAX}=P_{MCMAX}$.

(PI Controller)

At a step S610, control unit 80 carries out the master cylinder pressure estimation with a range from the lower limit value set at steps S550 through S570 to the upper limit value set at steps S580 through S600. That is to say, an error $P_{B\_ERROR\_T}$ calculated at step S540 is proportionally and integrally controlled and master cylinder pressure estimated value $P\hat{}_{MC}$ is adjusted so that $P\hat{}_{WC}=P\hat{}_B$. $P\hat{}_{MC}=K_{p\_PMC}\cdot P_{B\_ERROR\_T}+K_{I\_PMC}\cdot \int P_{B\_ERROR\_T}dt$, wherein $K_{p\_PMC}$ and $K_{I\_PMC}$ denote proportional and integration gains. That is to say, $P\hat{}_{MC}=\text{limit}(K_{p\_PC}\cdot P_{B\_ERROR\_T}+K_{I\_PMC}\cdot \int P_{B\_ERROR\_T}dt, P_{B\_LIN\_MAX}, P_{B\_LIM\_MIN})$. It is note that, in this embodiment, the proportional-integration control is carried out but merely integration control term or differential control term may be added.

In the embodiment of the brake liquid pressure estimating apparatus, the wheel cylinder liquid pressure estimated values $P\hat{}_{WC}$ and $P\hat{}_B$ are derived for each of the four road wheels FL, FR, RL, and RR. In addition, in this embodiment, estimating section 30d of control unit 30 includes PI controller 70 which estimates master cylinder liquid pressure in the way described above. That is to say, the differences in the wheel cylinder estimated values ($P\hat{}_{WC}-P\hat{}_B$) for the front left and right road wheels FL and FR are added together and the added result is multiplied with the front road wheel side gain $K_{ERROR\_F}$ are added to those for the rear left and right road wheels RL and RR and the added result is multiplied with the rear road wheel side gain $K_{ERROR\_R}$ which is smaller than the front road wheel side gain $K_{ERROR\_F}$. That is to say, a very large load is applied onto the front road wheel side as compared with the rear road wheel side when the vehicle stops. Since a difference in small values is easy to variously be influenced, the master cylinder liquid pressure is estimated with a great importance placed on the differences in the front road wheel side. Consequently, a more accurate estimation of the wheel cylinder liquid pressure can be achieved.

In this embodiment, the sudden brake determination is carried out to determine whether the sudden brake occurs at step S550. if the sudden brake through brake pedal 23 occurs, the lower limit value of the master cylinder liquid pressure estimated value is set as a maximum value of the second wheel cylinder liquid pressure estimated values for the four road wheels $P\hat{}_{WC\_FL}$, $P\hat{}_{WC\_FR}$, $P\hat{}_{WC\_RL}$, and $P\hat{}_{WC\_RR}$ using the vehicle model. That is to say, if the sudden brake through brake pedal 23 occurs, an abrupt (sudden) deceleration of the vehicle is carried out. The second wheel cylinder liquid pressure estimated values $P\hat{}_{WC\_FL}$, $P\hat{}_{WC\_FR}$, $P\hat{}_{WC\_RL}$, and $P\hat{}_{WC\_RR}$ are highly reliable and have high responsive characteristics. At this time, the first wheel cylinder liquid pressure estimated values $P\hat{}_{B\_FL}$, $P\hat{}_{B\_FR}$, $P\hat{}_{B\_RL}$, and $P\hat{}_{B\_RR}$ are calculated on the basis of the estimated value of the master cylinder liquid pressure so that there is a possibility that a time is needed to converge into the real value thereof. Hence, the highly reliable and high responsive values are set to the lower limit value. Then, an estimation error can be minimized.

In this embodiment, the brake release determination is carried out to determine whether a brake release (the release operation from brake pedal 23) occurs (corresponding to step S580 in FIG. 8). If the brake release is carried out, the upper limit value of the master cylinder liquid pressure estimated value is set to the maximum value of the second wheel cylinder liquid pressure estimated value for each road wheel, viz., max ($P\hat{}_{WC\_FL}$, $P\hat{}_{WC\_FR}$, $P\hat{}_{WC\_RL}$, and $P\hat{}_{WC\_RR}$) That is to say, if the brake release is carried out, the master cylinder liquid pressure value is at a stroke, to be reduced but there is a possibility that a response delay occurs. Since, at this time, there is no possibility that the master cylinder liquid pressure is higher than the wheel cylinder liquid pressure for each road wheel, the highly reliable and fast responsive second wheel cylinder liquid pressure is set to the upper limit described above. Thus, the estimation error can be minimized. It is noted that (G/V) denotes a gross valve, (w/c) denotes the wheel cylinder, and the variation rate of the wheel velocity includes the meaning of the acceleration and deceleration.

The contents of a Japanese Patent Application No. 2002-253141 (filed in Japan on Aug. 30, 2002) are herein incorporated by reference. Various changes and modifications may be made without departing from the sprit and scope of the present invention which is to be defined in the appended claims.

What is claimed is:

1. A brake pressure estimating apparatus for an automotive vehicle, comprising:
   a brake system including a master cylinder which develops a hydraulic in response to at least a brake manipulation as a hydraulic source and a brake pressure controlling section that is enabled to arbitrarily control a brake pressure of each wheel cylinder;
   a first wheel cylinder brake liquid pressure estimating section that estimates a first brake liquid pressure of the wheel cylinder of each of road wheels on the basis of a model of the brake pressure controlling section for each of control periods;
   a second wheel cylinder brake liquid pressure estimating section that estimates a second brake liquid pressure of the wheel cylinder for each road wheel on the basis of a vehicular model with a vehicular characteristic using a signal indicative of a road wheel acceleration as an element of a vehicular state for each control period; and
   a master cylinder liquid pressure estimating section that estimates a liquid pressure of the master cylinder for each control period on the basis of the first and second brake liquid pressure estimated values of the wheel cylinder of each road wheel estimated by the first wheel cylinder liquid pressure estimating section and the second wheel cylinder brake liquid pressure estimating section, the first wheel brake cylinder liquid pressure estimating section calculates the first brake liquid pressure of the wheel cylinder of each road wheel on the basis of the master cylinder liquid pressure estimated value estimated at a previous control period and the first liquid pressure estimated value estimated at the previous control period, the second wheel cylinder brake liquid pressure estimating section including a vehicular motion state detecting section that detects a vehicular motion state and calculating the second wheel cylinder brake liquid pressure for each road wheel from the detected vehicular motion state, and the master cylinder liquid pressure estimating section outputting the master cylinder liquid pressure estimated value to make a difference between the first wheel cylinder brake liquid pressure estimated value and the second wheel cylinder brake liquid pressure estimated value small to the first wheel cylinder brake liquid pressure estimating section to cause the master cylinder liquid pressure estimated value to be converged into a true value thereof.

2. A brake pressure estimating apparatus for an automotive vehicle as claimed in claim 1, wherein the vehicular motion state detecting section equipped in the second wheel cylinder brake liquid pressure estimating section includes a detecting section to detect a wheel velocity variation rate of one of the wheels which is a controlled object and the master cylinder liquid pressure estimating section makes the first brake liquid pressure estimated value approach to the second brake liquid pressure to make the difference between the first brake liquid pressure estimated value and the second brake liquid pressure estimated value small to converge the master cylinder estimated liquid pressure into the true value thereof.

3. A brake pressure estimating apparatus for an automotive vehicle as claimed in claim 1, wherein the second liquid pressure estimating section comprises: a maximum brake liquid pressure calculating section that calculates a maximum brake liquid pressure $P_{B\_MAX}$ by which each road wheel is enabled to be braked at maximum on the basis of a braking liquid pressure $P_{STAT}$ under a static wheel load and a wheel load movement due to a vehicular braking or vehicular turning; a braking liquid pressure variation rate calculating section that calculates a braking liquid pressure variation rate $P_{BDEF}$ caused by a road wheel moment by multiplying the corresponding vehicular road wheel acceleration $\dot{V}w$ detected by a wheel velocity detecting section with a predetermined coefficient $K_{VW}$ related to a vehicular inertia moment; a determination coefficient calculating section that calculates a determination coefficient $P_{B\_ROAD\_RETIO}$ to determine whether a driven wheel is under a pressure increase state or under a pressure decrease state as follows: $P_{B\_ROAD\_RETIO} = P_{B\_ROAD\_RETIO} + \text{INCN}(w/c) \cdot K_{INC} - \text{DECN}(w/c) \cdot K_{DEC}$, wherein $P_{B\_ROAD\_RETIO}$ at a right side term of the above equation denotes $P_{B\_ROAD\_RETIO}$ at the previous control period, INCN (w/c) denotes a pressure increase pulse duration, DECN(w/c) denotes a pressure decrease pulse duration, $K_{INC}$ denotes a coefficient to convert the pressure increase pulse duration INCN to a hydraulic pressure, and $K_{DEC}$ denotes a coefficient to convert the pressure decrease pulse duration DECN to the hydraulic pressure; an each road wheel cylinder brake liquid pressure calculating section that calculates each road wheel braking liquid pressure $P_{B\_ROAD}$ as follows: $P_{B\_ROAD} = (P_{B\_ROAD\_RETIO}/\Sigma(P_{B\_ROAD\_RETIO})) \cdot X_G \cdot K_{PB}$, wherein $X_G$ denotes a longitudinal acceleration of the vehicle and $K_{PB}$ denotes a coefficient determined as a vehicular weight and vehicular road wheel brake pad frictional coefficient μ; and a second brake liquid pressure estimated value outputting section that calculates and outputs the wheel cylinder liquid pressure estimated value for each road wheel $P\hat{}_{WC}$ as follows: $P\hat{}_{WC}=\min(P_{B\_ROAD}, P_{B\_MAX})+P_{BDF}$.

4. A brake pressure estimating apparatus for an automotive vehicle as claimed in claim 3, wherein the first wheel cylinder brake liquid pressure estimating section comprises: a pump increase determining section that determines whether a hydraulic pump pressure increase occurs in the model of the pressure controlling section; a wheel cylinder inflow quantity calculating section that calculates a wheel cylinder inflow quantity $Q_{IN}$, when the hydraulic pump pressure increase occurs, as follows: $Q_{IN}=K_{PUMP} \cdot INCN(G/V)$, wherein $INCN(G/V)$ denotes a pressure increase pulse duration and $K_{PUMP}$ denotes a pump capability coefficient; a wheel cylinder outflow quantity calculating section that calculates a wheel cylinder outflow quantity $Q_{OUT}$ from a pressure decrease pulse duration $DECN(G/V)$ and a difference in pressure between the master cylinder liquid pressure estimated value $P\hat{}_{MC}$ and the first brake liquid pressure $P\hat{}_B$ at the previous control period multiplied with a cut valve capability coefficient $K_{CUT}$, when the hydraulic pump pressure increase occurs; a wheel cylinder variation quantity calculating section that calculates a wheel cylinder variation quantity per unit time $dQb/dt$ from the wheel cylinder inflow quantity $Q_{IN}$ and the wheel cylinder outflow quantity $Q_{OUT}$; a wheel cylinder liquid quantity calculating section that calculates an integration of the calculated wheel cylinder variation quantity $dQb/dt$ with respect to time to derive a wheel cylinder liquid quantity $Qb$; and a first brake liquid pressure outputting section that calculates and outputs the first brake liquid pressure $P\hat{}_B$ as follows: $P\hat{}_B=f(Qb)$.

5. A brake pressure estimating apparatus for an automotive vehicle as claimed in claim 3, wherein the first brake liquid pressure estimating section comprises: a pump increase determining section that determines whether a hydraulic pump pressure increase occurs in the model of the pressure controlling section; a wheel cylinder inflow quantity calculating section that calculates a wheel cylinder inflow quantity $Q_{IN}$ when the hydraulic pump pressure increase does not occur as follows: $Q_{IN}=K_{IN}(P\hat{}_{MC}-P\hat{}_B) \cdot INCN(w/c)$, wherein $INCN(w/c)$ denotes a pulse duration time of a corresponding wheel cylinder IN valve, $K_{IN}$ denotes a predetermined IN valve predetermined coefficient, $P\hat{}_{MC}$ denotes the master cylinder liquid pressure estimated value at the previous control period, and $P\hat{}_B$ denotes the first wheel cylinder liquid pressure estimated value estimated at the previous control period; a wheel cylinder outflow quantity calculating section that calculates a wheel cylinder outflow quantity $Q_{OUT}$ from a pulse duration time of the corresponding wheel cylinder OUT valve $DECN(w/c)$ and the first wheel cylinder brake liquid pressure estimated value $P\hat{}_B$ at the previous control period multiplied with an OUT valve predetermined coefficient $K_{OUT}$, when the hydraulic pump pressure increase does not occur; a wheel cylinder variation quantity calculating section that calculates a wheel cylinder variation quantity per unit time $dQb/dt$ from the wheel cylinder inflow quantity $Q_{IN}$ and the wheel cylinder outflow quantity $Q_{OUT}$; a wheel cylinder liquid quantity calculating section that calculates an integration of the calculated wheel cylinder variation quantity $dQb/dt$ with respect to time to derive a wheel cylinder liquid quantity $Qb$; and a first brake liquid pressure outputting section that calculates and outputs the first brake liquid pressure estimated value $P\hat{}_B$ as follows: $P\hat{}_B=f(Qb)$.

6. A brake pressure estimating apparatus for an automotive vehicle as claimed in claim 4, wherein the master cylinder liquid pressure estimating section comprises: a wheel cylinder brake liquid pressure error calculating section that calculates an error between the first and second wheel cylinder brake pressure estimated values as follows: $P_{B\_ERROR}=P\hat{}_{WC}-P\hat{}_B$; a four-wheel total error calculating section that calculates total of each error of the four wheels $P_{B\_ERROR\_T}$ as follows: $P_{B\_ERROR\_T}=(P_{B\_ERROR\_FL}+P_{B\_ERROR\_FR}) \times K_{ERROR\_F}+ (P_{B\_ERROR\_RL}+P_{B\_ERROR\_RR}) \times K_{ERROR\_R}$, wherein $K_{ERROR\_F}$ denotes a front wheel error gain and $K_{ERROR\_R}$ denotes a rear wheel error gain and $K_{ERROR\_F}>K_{ERROR\_R}$; an anti-lock brake control execution determining section that determines whether the anti-lock brake control is being executed and the second wheel cylinder brake liquid pressure estimated value $P\hat{}_{WC}$ is larger than the first wheel cylinder brake liquid pressure estimated value $P\hat{}_B$ and a brake control target value $P^*_B$; a master cylinder liquid pressure estimated value lower limit value setting section that sets a lower limit value of the master cylinder liquid pressure estimated value $P_{B\_LIM\_MIN}$ to a maximum value of the estimated values for the second brake liquid pressures $MAX(P\hat{}_{WC\_FL}, P\hat{}_{WC\_FR}, P\hat{}_{WC\_RL}, P\hat{}_{WC\_RR})$ to determine whether a sudden brake has occurred when the anti-lock brake control is being executed and the second wheel cylinder liquid pressure estimated value $P\hat{}_{WC}$ is larger than the first wheel cylinder brake liquid pressure estimated value $P\hat{}_B$ and the brake control target value $P^*_B$; a brake release determining section that determines whether the anti-lock brake control is being executed and $X_G>K_{XG} \cdot (\Sigma P\hat{}_B) \cdot GAIN_{PB}$ to determine whether the brake manipulation is released, wherein $X_G$ denotes a detected value of the longitudinal acceleration of the vehicle, $K_{XG}$ denotes a coefficient dependent upon a vehicular weight and a brake pad frictional coefficient μ, $GAIN_{PB}$ denotes a predetermined liquid pressure gain, and $\Sigma P\hat{}_B$ denotes the total of the first wheel cylinder brake liquid pressure estimated value for each road wheel; and a master cylinder liquid pressure estimated value maximum value setting section that sets a maximum value $P_{B\_LIM\_MAX}$ of the master cylinder liquid pressure estimated value from each road wheel second brake liquid pressure estimated value $P\hat{}_{WC\_FL}, P\hat{}_{WC\_FR}, P\hat{}_{WC\_RL}$, and $P\hat{}_{WC\_RR}$ when the anti-lock brake control is being executed and $X_G>K_{XG} \cdot (\Sigma P\hat{}_B) \cdot GAIN_{PB}$; and a master cylinder liquid pressure estimated value adjusting section that controls and adjusts the total error $P_{B\_ERROR\_T}$ to make the second wheel cylinder brake liquid pressure estimated value $P\hat{}_{WC}$ equal to the first wheel cylinder brake liquid pressure estimated value $P\hat{}_B$.

7. A brake pressure estimating apparatus for an automotive vehicle as claimed in claim 6, wherein $P_{B\_LIM\_MIN}=0$ when the anti-lock brake control is not being executed or the second wheel cylinder liquid pressure estimated value $P\hat{}_{WC}$ is not larger than the first wheel cylinder brake liquid pressure estimated value $P\hat{}_B$ nor the brake control target value $P^*_B$.

8. A brake pressure estimating apparatus for an automotive vehicle as claimed in claim 6, wherein $P_{B\_LIM\_MAX}=P_{MCMAX}$, wherein $P_{MCMAX}$ denotes a maximum pressure up to which the master cylinder is enabled to be developed when the anti-lock brake control is not being executed or $X_G \leq K_{XG} \cdot (\Sigma P\hat{}_B) \cdot GAIN_{PB}$.

9. A brake pressure estimating apparatus for an automotive vehicle as claimed in claim 6, wherein the master cylinder liquid pressure estimated value adjusting section carries out the following proportional-and-integration control to adjust the master cylinder liquid pressure estimated value:

$P^\wedge_{MC}=\text{limit}(K_{P\_PMC} \cdot P_{B\_ERROR\_T}+K_{I\_PMC} \cdot \int P_{B\_ERROR\_T} dt, P_{B\_LIM\_MAX}, P_{B\_LIM\_MIN})$, wherein $K_{P\_PMC}$ denotes a proportional gain of the proportional-and-integration control and $K_{I\_PMC}$ denotes an integration gain of the proportional-and-integration control.

10. A brake pressure estimating apparatus for an automotive vehicle as claimed in claim 3, wherein the maximum brake liquid pressure calculating section calculates the maximum brake liquid pressure $P_{B\_MAX}$ for four road wheels of the vehicle as follows: $P_{BMAX\_FL}=P_{STAT\_F}-K_X \cdot X_G+K_Y \cdot Y_G$; $P_{BMAX\_FR}=P_{STAT\_F}-K_X \cdot X_G-K_Y \cdot Y_G$; $P_{BMAX\_RL}=P_{STAT\_R}+K_X \cdot X_G+K_Y \cdot Y_G$, and $P_{BMAX\_RR}=P_{STAT\_R}+K_X \cdot X_G-K_Y \cdot Y_G$, wherein $X_G$ denotes a detected value of the longitudinal acceleration of the vehicle, FL denotes a front left road wheel, FR denotes a front right road wheel, RL denotes a rear left road wheel, and RR denotes a rear right road wheel, F denotes a front road wheel side and R denotes a rear road wheel side, $K_X$ denotes a hydraulic pressure conversion coefficient for the longitudinal acceleration, $Y_G$ denotes a detected value of a lateral acceleration, and $K_Y$ denotes a hydraulic pressure conversion coefficient for the lateral acceleration.

11. A brake pressure estimating apparatus for an automotive vehicle as claimed in claim 4, wherein $Q_{OUT}=K_{CUT}$ $(P^\wedge_B - P^\wedge_{MC}) \cdot \text{DECN}(G/V)$ when the hydraulic pump pressure increase occurs and $Q_{OUT}=K_{OUT} \cdot P^\wedge_B \cdot \text{DECN}(w/c)$ when a master cylinder pressure increase occurs but the hydraulic pump pressure increase does not occur.

12. A brake pressure estimating apparatus for an automotive vehicle as claimed in claim 11, wherein $Q_{IN}=K_{IN} \cdot (P^\wedge_{MC}-P^\wedge_B) \cdot \text{INCN}(w/c)$ when the master cylinder pressure increase occurs but the hydraulic pump pressure increase does not occur.

13. A brake pressure estimating apparatus for an automotive vehicle as claimed in claim 4, wherein $dQb/dt = Q_{IN}-Q_{OUT}$.

14. A brake pressure estimating method for an automotive vehicle, the automotive vehicle comprising: a brake system including a brake liquid pressure generator which develops a brake liquid pressure at each wheel cylinder of a road wheel and a brake pressure controlling section that is enabled to arbitrarily control a brake pressure of each wheel cylinder, the brake pressure estimating method comprising:
  estimating a first brake liquid pressure of the wheel cylinder of each road wheel on the basis of a model of the brake pressure controlling section for each control period;
  estimating a second brake liquid pressure of the wheel cylinder for each of road wheels on the basis of a vehicular model with a vehicular characteristic using a signal indicative of a road wheel acceleration as an element of a vehicular state for each of control periods; and
  estimating a liquid pressure of the brake liquid pressure generator for each control period on the basis of the first and second brake liquid pressure estimated values of the wheel cylinder of each road wheel, at the first wheel cylinder liquid pressure estimating, calculating the first brake liquid pressure of the wheel cylinder of each road wheel on the basis of a brake pressure generator estimated value estimated at a previous control period and the first brake liquid pressure estimated value estimated at the previous control period, at the second wheel cylinder brake liquid pressure estimating, detecting a vehicular motion state and calculating the second wheel cylinder brake liquid pressure for each road wheel from the detected vehicular motion state, and, at the brake liquid pressure generator estimating, outputting the brake liquid pressure generator estimated value to make a difference between the first wheel cylinder brake liquid pressure estimated value and the second wheel cylinder brake liquid pressure estimated value small to cause the brake liquid pressure generator estimated value to be converged into a true value thereof.

15. A brake pressure estimating apparatus for an automotive vehicle, comprising:
  a brake system comprising
    a brake liquid pressure generator which develops a brake liquid pressure at each wheel cylinder of a road wheel, and
    a brake pressure controlling section configured to arbitrarily control the brake pressure of each wheel cylinder;
  a brake liquid pressure estimating section comprising
    a first brake liquid pressure estimating section that estimates a first brake liquid pressure of the wheel cylinder ($P^\wedge_{WC}$) on the basis of a brake pressure controlling model,
    a second brake liquid pressure estimating section that estimates a second brake liquid pressure of the wheel cylinder ($P_B$) on the basis of a vehicular model having a vehicular characteristic that uses a signal indicative of a road wheel acceleration as an element of a vehicular state, and
    a third brake liquid pressure estimating section that estimates a third brake liquid pressure of a brake generator ($P^\wedge_{MC}$) on the basis of the first and the second brake liquid pressure of the wheel cylinder ($P^\wedge_{WC}$, $P_B$), wherein the brake pressure estimating section estimates the third brake liquid pressure of the brake generator ($P^\wedge_{MC}$) regardless of whether the brake pressure controlling section is executed.

16. A brake pressure estimating apparatus for an automotive vehicle, comprising:
  a brake system comprising
    a brake liquid pressure generator which develops a brake liquid pressure at each wheel cylinder of a road wheel, and
    a brake pressure controlling section configured to arbitrarily control the brake pressure of each wheel cylinder;
  a brake liquid pressure estimating section comprising
    a first brake liquid pressure estimating section that estimates a first brake liquid pressure of the wheel cylinder ($P^\wedge_{WC}$) on the basis of a model of a brake pressure controlling model,
    a second brake liquid pressure estimating section that estimates a second brake liquid pressure of the wheel cylinder ($P_B$) on the basis of a vehicular model having a vehicular characteristic that uses a signal indicative of a road wheel acceleration as an element of a vehicular state, and
    a third brake liquid pressure estimating section that estimates a third brake liquid pressure of a brake generator ($P^\wedge_{MC}$) on the basis of the first and the second brake liquid pressure of the wheel cylinder ($P^\wedge_{WC}$, $P_B$), wherein the brake liquid pressure estimating section estimates the third brake liquid pressure of a master cylinder ($P^\wedge_{MC}$) even without manipulation of a brake pedal.

17. A brake pressure estimating apparatus as claimed in claim 15, wherein a value of the road wheel acceleration ($\dot{V}w$) is inputted to the vehicular model.

18. A brake pressure estimating apparatus far an automotive vehicle as claimed in claim 17, wherein the brake liquid pressure estimating section estimates the second brake liquid pressure ($P_B$) of the wheel cylinder on the basis of the value of the road wheel acceleration ($\dot{V}w$).

19. A brake pressure estimating apparatus for an automotive vehicle as claimed in claim 18, wherein the third brake liquid pressure estimating section makes a difference the first brake liquid pressure of the wheel cylinder ($P^\wedge_{WC}$) and the second brake liquid pressure of the wheel cylinder ($P_B$) small to converge the third brake liquid pressure ($P^\wedge_{MC}$) into a true value thereof.

20. A brake pressure estimating apparatus for an automotive vehicle, comprising:
   a brake system comprising
      a brake liquid pressure generator which develops a brake liquid pressure at front road wheel side and rear road wheel side wheel cylinders of four road wheels, and
      a brake pressure controlling sections that is enabled to arbitrarily control the brake pressure of each wheel cylinder;
   a brake liquid pressure estimating section comprising
      a first brake liquid pressure estimating section that estimates a first front road side and rear road side brake liquid pressure of the respective front road side and rear road side wheel cylinders ($P^\wedge_{WC}$) on the basis of a model of the brake pressure controlling model,
      a second brake liquid pressure estimating section that estimates a second front road side and rear road side brake liquid pressure of the respective front road side and rear road side wheel cylinders ($P_B$) on the basis of a vehicular model with a vehicular characteristic that uses a signal indicative of a road wheel acceleration as an element of a vehicular state, and
      a third brake liquid pressure estimating section that includes a front road side gain and a rear road side gain, whose value is smaller than that of the front road side gain and estimates a third brake liquid pressure of a brake generator ($P^\wedge_{MC}$) on the basis of the first and the second brake liquid pressure of the respective front road side and rear road side wheel cylinders ($P^\wedge_{WC}$, $P_B$) using the front road side gain and the rear road side gain.

21. A brake pressure estimating apparatus for an automotive vehicle, comprising:
   a brake system comprising
      a brake liquid pressure generator which develops a brake liquid pressure at each wheel cylinder of a road wheel, and
      a brake pressure controlling section configured to arbitrarily control the brake pressure of each wheel cylinder;
   a brake liquid pressure estimating section comprising
      a sudden brake determination section that determines whether a sudden brake occurs,
      a first brake liquid pressure estimating section that estimates a first brake liquid pressure of the wheel cylinder ($P_{WC}$) on the basis of a brake pressure controlling model,
      a second brake liquid pressure estimating section that estimates a second brake liquid pressure of the wheel cylinder ($P_B$) on the basis of a vehicular model, and
      a third brake liquid pressure estimating section that estimates a third brake liquid pressure of a brake generator ($P^\wedge_{MC}$) on the basis of the first and the second brake liquid pressure, wherein the third liquid pressure estimating section sets the lower limit value of the third brake liquid pressure as a maximum value of the first brake liquid pressure of the wheel cylinder ($P^\wedge_{WC}$, $P_B$) when the sudden brake is determined.

22. A brake pressure estimating apparatus for an automotive vehicle, comprising:
   a brake system comprising
   a brake liquid pressure generator which develops a brake liquid pressure at each wheel cylinder of a road wheel, and
   a brake pressure controlling section that is enabled to arbitrarily control the brake pressure of each wheel cylinder;
   a brake liquid pressure estimating section comprising
      a brake release determination section that determines whether a brake release occurs,
      a first brake liquid pressure estimating section that estimates a first brake liquid pressure of the wheel cylinder ($P^\wedge_{WC}$) on the basis of a brake pressure controlling model,
      a second brake liquid pressure estimating section that estimates a second brake liquid pressure of the wheel cylinder ($P_B$) on the basis of a vehicular model, and
      a third brake liquid pressure estimating section that estimates a third brake liquid pressure of a brake generator ($P^\wedge_{MC}$) on the basis of the first and the second brake liquid pressure, wherein the third liquid pressure estimating section sets the upper limit value of the third brake liquid pressure as a maximum value of the first brake liquid pressure of the wheel cylinder ($P^\wedge_{WC}$, $P_B$) when the brake release is determined.

23. A brake pressure estimating apparatus as claimed in claim 16, wherein a value of the road wheel acceleration ($\dot{V}w$) is inputted to the vehicular model.

24. A brake pressure estimating apparatus for an automotive vehicle as claimed in claim 23, wherein the brake liquid pressure estimating section estimates the second brake liquid pressure ($P_B$) of the wheel cylinder on the basis of value of the road wheel acceleration ($\dot{V}w$).

25. The brake pressure estimating apparatus for an automotive vehicle as claimed in claim 1, wherein said second wheel cylinder brake liquid estimating section is configured such that the signal indicative of the road wheel acceleration is used, in a separately calculated factor of the vehicular model.

26. The brake pressure estimating method for an automotive vehicle as claimed in claim 14, wherein, in the step of estimating the second brake liquid pressure, the signal indicative of the road wheel acceleration is used in a separately calculated factor of the vehicular model.

* * * * *